UNITED STATES PATENT OFFICE.

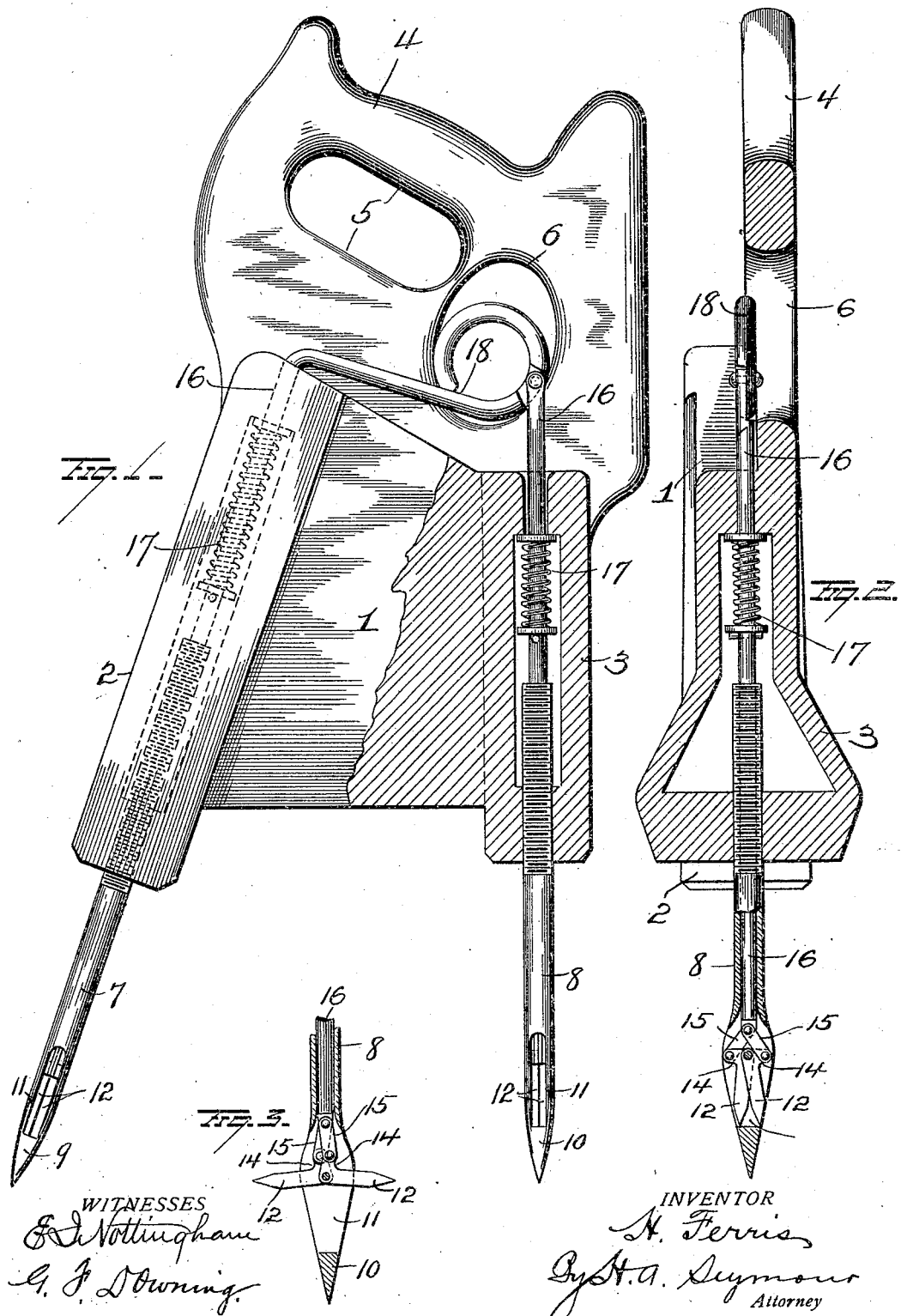

HENRY FERRIS, OF ARDOCH, NORTH DAKOTA.

DEVICE FOR SHOCKING GRAIN BY HAND.

959,492. Specification of Letters Patent. Patented May 31, 1910.

Application filed March 11, 1909. Serial No. 482,851.

*To all whom it may concern:*

Be it known that I, HENRY FERRIS, of Ardoch, in the county of Walsh and State of North Dakota, have invented certain new and useful Improvements in Devices for Shocking Grain by Hand; and I do hereby declare the following to be a full, clear, and exact description of the invention, such as will enable others skilled in the art to which it appertains to make and use the same.

This invention relates to devices for shocking grain by hand,—one object of the invention being to provide means to be carried and operated by the hands, which will enable the operator to readily pick up bundles of grain without having to bend the body to a considerable extent, and which will permit him to place the bundles on a shock without necessity of bringing his hands into contact with the bundles.

A further object is to provide a hand-operated device for engaging and carrying bundles of grain and for readily releasing the same when placed in position on a shock.

With these objects in view the invention consists in certain novel features of construction and combinations of parts as hereinafter set forth and pointed out in the claims.

In the accompanying drawings, Figure 1 is an elevation of a hand shocking device embodying my improvements. Fig. 2 is a side elevation partly broken away, and Fig. 3 is a detail view.

1 represents the body portion of the device provided at its side edges with hollow arms or enlargements 2—3 which are disposed at an angle to each other so that they will diverge forwardly. The body portion 1 is provided at its rear end with a handle 4 having a slot 5 for the accommodation of some of the fingers of the hand and also having an opening 6 for the reception of the index finger of the hand which will be employed to operate a trigger disposed in line with the opening 6 as hereinafter explained. Tubular tines 7—8 project from the forward ends of the arms or enlargements 2—3 and at their rear ends, said tubular tines terminate within the hollow arms or enlargements. The tines 7—8 thus project forwardly at an angle to each other and parallel with the axes of the respective arms or enlargements 2—3. The tines are provided at their forward ends with pointed heads 9—10 having lateral slots 11 and within said pointed heads, pointed fingers 12 (two in each head) are pivotally supported. The fingers of each pair are provided at their pivoted ends with lugs or projections 14 and the lugs or projections of each pair of fingers are connected, by means of links 15 with rods 16 which pass freely through the rear ends of the tubular tines and the hollow arms or enlargements at the edges of the body of the device. A spring 17 encircles each rod 16 within the hollow enlargement through which it passes and these springs operate to force the rods 16 outwardly and cause the fingers 12, through the medium of the links 15, to be inclosed within the heads of the hollow tines in rear of the pointed ends thereof. One of the rods 16 is provided with a laterally projecting arm which terminates in a loop disposed in line with the opening 6 and constitutes a trigger 18. The other rod 16 is pivotally connected at its rear end with the trigger 18, as shown in Fig. 1.

The operation of the device is as follows:—The operator will carry one of the devices in each hand to enable him to pick up two bundles at a time and place them in position on a shock. He will cause the pointed tines to enter a bundle of grain and then by pulling the trigger 18 the pointed fingers in the heads of both tines will be projected outwardly or laterally, when the bundle can be raised from the ground and carried to the shock without danger of being dropped. After the bundles have been placed in position on the shock, the operator will release the trigger and the springs 17 will act to cause the pointed fingers to become inclosed within the heads of the tines and thus the latter may be readily released from the bundles without danger of displacing the latter.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent is,—

1. A hand shocking-device comprising a body portion provided at one end with a hand-hold, pointed tines projecting from said body portion, pivoted fingers carried by said tines, and manually operated means terminating coincident with the hand-hold for causing said fingers to be projected laterally from said tines in rear of the pointed ends thereof.

2. A hand shocking-device comprising a body portion, divergent tines projecting forwardly therefrom, pivoted fingers carried by said tines in rear of the pointed ends thereof, means for causing said fingers to be inclosed within the tines, and a hand hold means terminating coincident with the hand hold for causing said fingers to be projected laterally from said tines.

3. A hand shocking-device comprising a body portion provided with a hand hold, forwardly projecting tubular tines having pointed free ends, fingers pivotally supported in each tine in rear of the pointed end thereof, rods freely movable in said tines, means for connecting said rods with the pivoted fingers for operating the latter, springs for moving said rods in one direction and manually operated means terminating coincident with the hand hold for moving the fingers in the other direction.

4. A hand shocking-device comprising a body portion and a plurality of forwardly projecting tubular tines having pointed heads at their free ends, two fingers mounted in each of said heads and provided with lugs, each of said heads being made with lateral slots for the passage of the pivoted fingers, rods freely movable in the tubular tines, links connecting said rods with the lugs of the pivoted fingers, a hand hold on said body portion, a manually operated trigger located coincident with said hand hold for operating both rods to cause the pivoted fingers to be projected through the lateral slots in the heads of the pointed tines, and springs for moving said rods in the reverse direction.

In testimony whereof, I have signed this specification in the presence of two subscribing witnesses.

HENRY FERRIS.

Witnesses:
 Geo. Hill,
 C. W. Denniston.